(12) United States Patent
Throndson et al.

(10) Patent No.: US 8,380,592 B2
(45) Date of Patent: Feb. 19, 2013

(54) METHODS, SYSTEMS, AND COMPUTER PROGRAM PRODUCTS FOR PROCESSING AND/OR PREPARING A TAX RETURN AND INITIATING CERTAIN FINANCIAL TRANSACTIONS

(75) Inventors: Timothy J. Throndson, Raleigh, NC (US); Thomas Field, Redding, CT (US)

(73) Assignee: Tax-N-Cash, L.L.C., Raleigh, NC (US)

( * ) Notice: Subject to any disclaimer, the term of this patent is extended or adjusted under 35 U.S.C. 154(b) by 3423 days.

(21) Appl. No.: 10/811,709

(22) Filed: Mar. 29, 2004

(65) Prior Publication Data

US 2005/0038722 A1    Feb. 17, 2005

Related U.S. Application Data

(60) Provisional application No. 60/494,866, filed on Aug. 13, 2003, provisional application No. 60/524,783, filed on Nov. 25, 2003.

(51) Int. Cl.
*G06Q 40/00* (2012.01)
(52) U.S. Cl. .................................................. 705/31
(58) Field of Classification Search .............. 705/31, 705/19
See application file for complete search history.

(56) References Cited

U.S. PATENT DOCUMENTS

| | | | |
|---|---|---|---|
| 4,890,228 A | 12/1989 | Longfield | 364/408 |
| 5,193,057 A | 3/1993 | Longfield | 364/408 |
| 5,724,523 A | 3/1998 | Longfield | 395/235 |
| 5,963,921 A * | 10/1999 | Longfield | 705/31 |
| 6,202,052 B1 | 3/2001 | Miller | 705/31 |
| 6,473,741 B1 * | 10/2002 | Baker | 705/31 |
| 7,010,507 B1 * | 3/2006 | Anderson et al. | 705/31 |
| 7,127,425 B1 * | 10/2006 | Wilson | 705/31 |
| 7,177,829 B1 * | 2/2007 | Wilson et al. | 705/31 |
| 7,234,103 B1 * | 6/2007 | Regan | 715/234 |
| 2001/0037268 A1 | 11/2001 | Miller | 705/31 |
| 2002/0013747 A1 * | 1/2002 | Valentine et al. | 705/31 |
| 2002/0111888 A1 | 8/2002 | Stanley et al. | 705/31 |
| 2002/0133410 A1 * | 9/2002 | Hermreck et al. | 705/19 |
| 2003/0036912 A1 * | 2/2003 | Sobotta et al. | 705/1 |
| 2003/0061131 A1 | 3/2003 | Parksan, Jr. | 705/30 |
| 2003/0233296 A1 * | 12/2003 | Wagner | 705/31 |

OTHER PUBLICATIONS

International Search Report and Written Opinion (10 pages) corresponding to International Application No. PCT/US04/26433; Mailing Date: Oct. 24, 2008.

* cited by examiner

*Primary Examiner* — Shay S Glass
(74) *Attorney, Agent, or Firm* — Myers Bigel Sibley & Sajovec, P.A.

(57) ABSTRACT

A tax return is processed by receiving tax information associated with a taxpayer where the tax information is in a plurality of formats. The tax information is converted into a common electronic format. A determination is made whether the tax information is sufficient to generate a tax return therefrom. A tax return is generated if the tax information has been determined to be sufficient.

15 Claims, 3 Drawing Sheets

METHODS, SYSTEMS, AND COMPUTER PROGRAM PRODUCTS FOR PROCESSING AND/OR PREPARING A TAX RETURN AND INITIATING CERTAIN FINANCIAL TRANSACTIONS

RELATED APPLICATIONS

This application claims the benefit of and priority to U.S. Provisional Patent Application No. 60/494,866, filed Aug. 13, 2003 and U.S. Provisional Patent Application No. 60/524,783, filed Nov. 25, 2003, the disclosures of which are hereby incorporated herein by reference as if set forth in their entireties.

FIELD OF THE INVENTION

The present invention relates to tax return preparation and filing, and, more particularly, to data processing methods, systems, and computer program products for preparing and filing a tax return and initiating certain financial transactions.

BACKGROUND OF THE INVENTION

Electronic filing of tax returns at both the federal and state levels has become increasingly commonplace in recent years. To file a return electronically, a taxpayer may hire a paid tax practitioner to prepare and file the return. Unfortunately, this may be prohibitively expensive for some taxpayers. Instead of hiring a professional tax practitioner, a taxpayer may obtain self-preparation tax software, which may be used to prepare a return and file the return electronically. While this may typically be less expensive than hiring a professional tax practitioner to prepare and file the return, some taxpayers may not have the resources to obtain a computer, the tax preparation software and/or Internet access to file their returns. Thus, there remains a need for improved tax preparation systems and methods that may be used to electronically prepare and/or file a tax return.

SUMMARY OF THE INVENTION

According to some embodiments of the present invention, a tax return is processed by receiving tax information associated with a taxpayer where the tax information is in a plurality of formats. The tax information is converted into a common electronic format. A determination is made whether the tax information is sufficient to generate a tax return therefrom. A tax return is generated if the tax information has been determined to be sufficient.

In accordance with other embodiments of the present invention, the formats may comprise text stored in paper-based source documents and/or digital information.

In accordance with still other embodiments of the present invention, the taxpayer may be presented with options for receiving value if the taxpayer is entitled to a refund and the taxpayer may be presented with options for paying a tax if the taxpayer owes the tax.

In accordance with still other embodiments of the present invention, an account is established with a financial institution if the taxpayer is entitled to a tax refund.

In accordance with still other embodiments of the present invention, the accuracy of the received tax information is evaluated and confirmed with the taxpayer. The tax information may be evaluated to determine if any tax information is missing, inconsistent, and/or incorrect.

Embodiments of the present invention may allow taxpayers with little or no knowledge of tax law to prepare and/or file a tax return on a self-serve basis. This may be particularly useful for low-income taxpayers who may not have the financial resources to engage a tax practitioner or obtain access to the Internet to file a tax return electronically. Thus, embodiments of the present invention may obviate the need for many taxpayers to engage paid tax preparers, may reduce the effort required by the user to prepare and file a tax return, may reduce the costs of preparing a tax return, may reduce the cost of tax preparation to the taxpayer, and/or may reduce the length of time that a taxpayer must wait to receive a tax refund.

Although described primarily above with respect to method aspects of processing and/or filing a tax return, it will be understood that the present invention may also be embodied as systems and computer program products.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
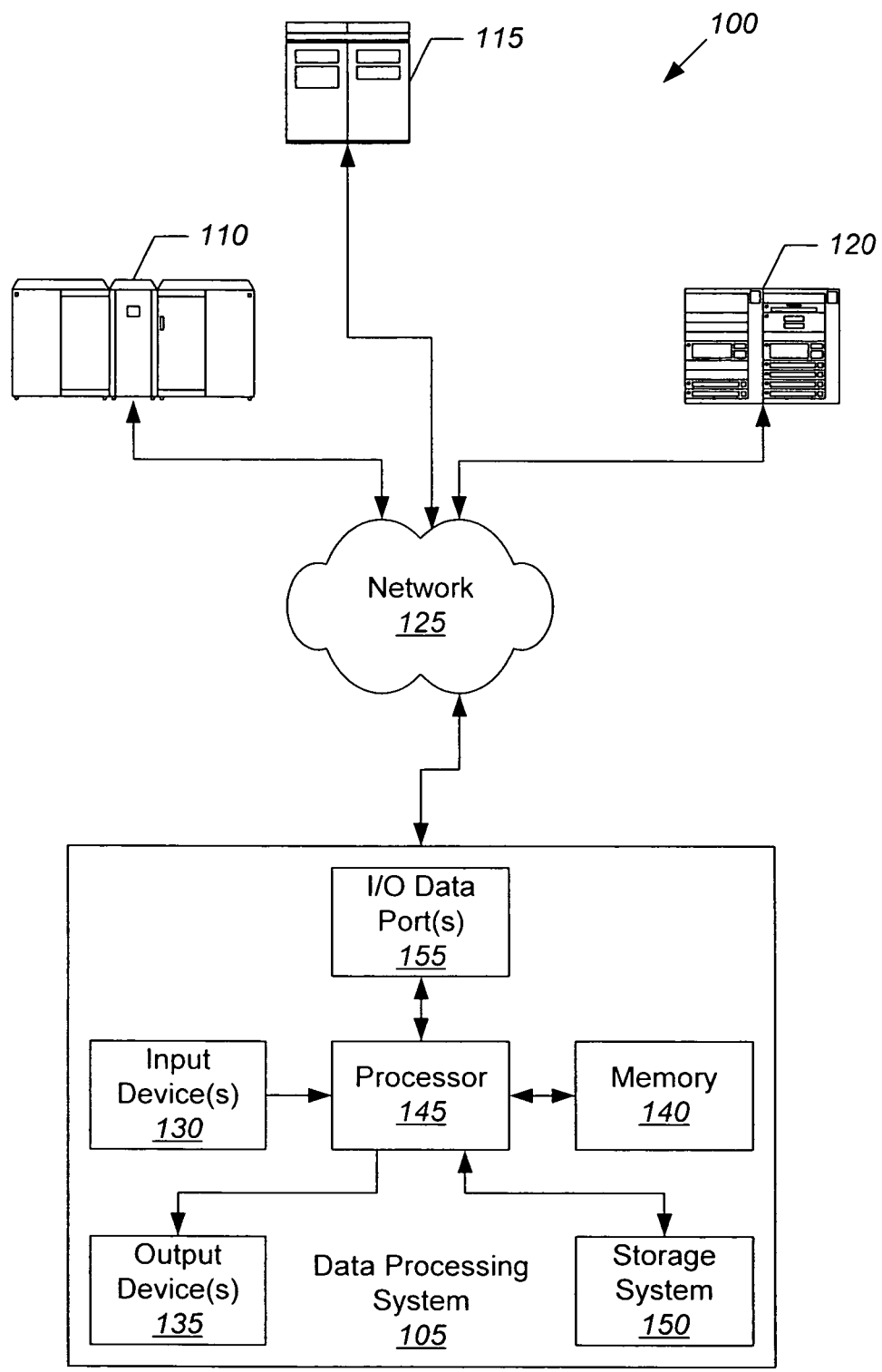
FIG. 1 is a block diagram that illustrates a communication network 100 for processing and/or filing a tax return in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

FIG. 1 is a block diagram that illustrates a communication network 100 for processing and/or filing a tax return in accordance with some embodiments of the present invention. As shown in FIG. 1, the communication network 100 comprises a data processing system 105 that may be configured to process and/or file a tax return. The communication network further comprises data processing systems 110 and 115 that are associated with one or more taxing authorities, such as, for example, the Internal Revenue Service (IRS) and/or state/municipal taxing authorities. A data processing system 120 may be a repository for tax related information and may be associated with, for example, a financial institution, governmental agency, investment institution, or the like. The data processing systems 105, 110, 115, and 120 communicate via a network 125, which may comprise, for example, the Internet, a wide area network, a local area network, and/or combinations of such networks.

The data processing system 105, in accordance with some embodiments of the present invention, comprises input device(s) 130, output devices 135, such as a display, and a memory 140 that communicate with a processor 145. The input devices 130 and the output devices 135 may comprise various peripheral devices, which include, but are not limited to, an identification card device, an electronic pen that may facilitate electronic signatures for documents, a display or screen, a scanner, a cash/credit acceptor, a keyboard, a mouse, a printer, a camera or other communication device that facilitates two-way live communication, and an audio speaker. The data processing system 105 may further comprise a storage system 150 and an I/O data port(s) 155 that also communicate with the processor 145. The storage system 150 may include removable and/or fixed media, such as floppy disks, ZIP drives, hard disks, or the like as well as virtual storage such as a RAMDISK. The I/O data port(s) 155 may be used to transfer information between the data processing system 105 and another computer system or a network (e.g., an Intranet and/or the Internet). These components may be conventional components, such as those used in many conventional computing devices, and their functionality, with respect to conventional operations, is generally known to those skilled in the art. In accordance with various embodiments of the present invention, the data processing system 105 may be embodied as a self-serve tax kiosk or system and may be configured to provide one or more of the following functions: process checks and/or other banking information to perform book-keeping operations; act as a stand-alone automatic teller machine (ATM); act as a stand-alone check cashing machine; act as a stand-alone Internet access machine; and/or act as a stand-alone self-service information kiosk. Moreover, the data processing system 105 may be incorporated into other types of kiosk systems providing various types of services.

Although FIG. 1 illustrates an exemplary communication network for processing and/or filing a tax return in accordance with some embodiments of the present invention, it will be understood that the present invention is not limited to such a configuration but is intended to encompass any configuration capable of carrying out operations described herein.

Figure 2:
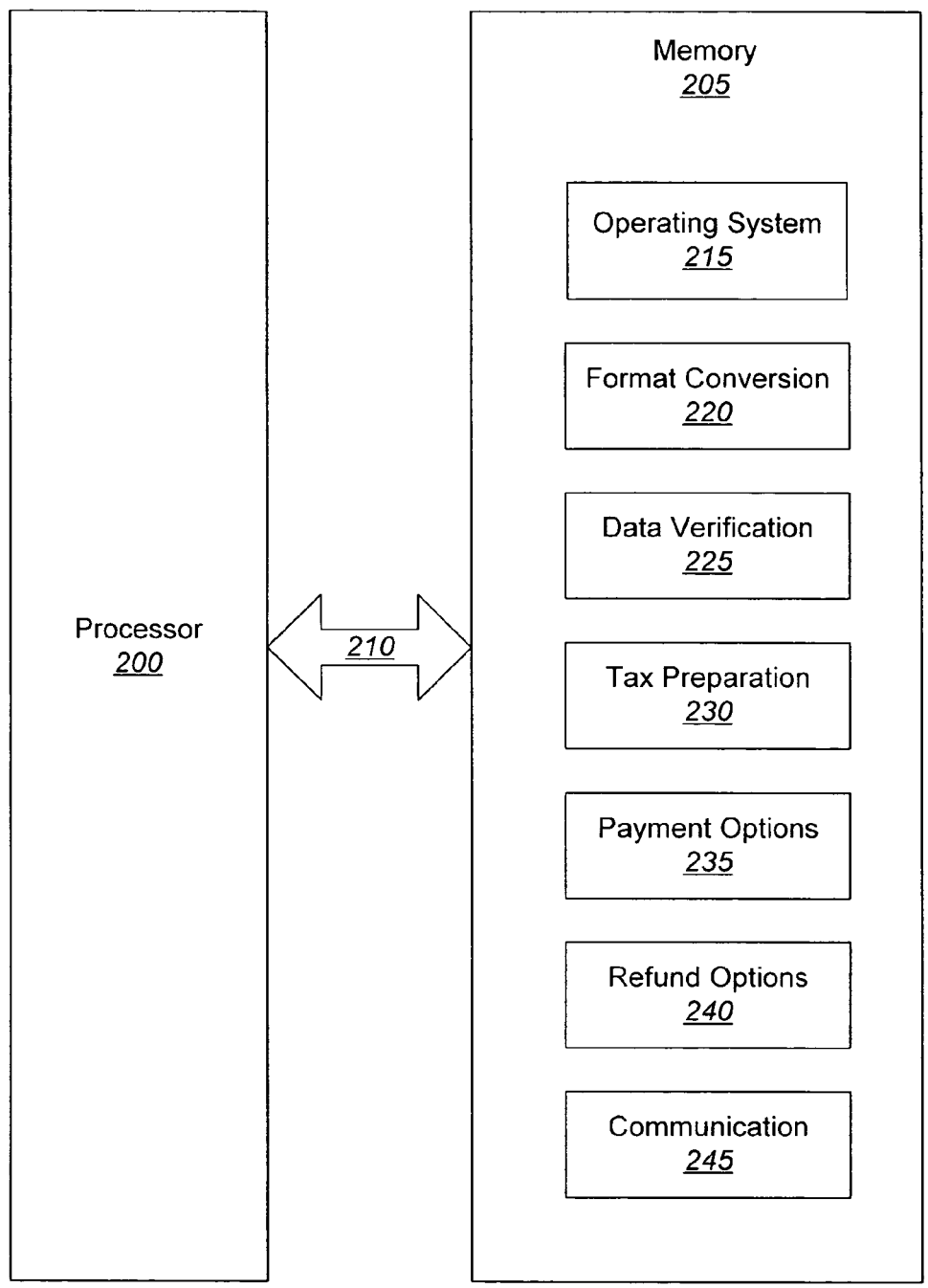
FIG. 2 illustrates a software architecture that may be used in data processing systems for processing and/or filing a tax return in accordance with some embodiments of the present invention.

FIG. 2 illustrates a processor 200 and memory 205 that may be used in embodiments of data processing systems, such as the data processing system 105 of FIG. 1, for processing and/or filing a tax return in accordance with some embodiments of the present invention. The processor 200 communicates with the memory 205 via an address/data bus 210. The processor 200 may be, for example, a commercially available or custom microprocessor. The memory 205 is representative of the one or more memory devices containing the software and data used to facilitate processing and/or filing tax returns in accordance with some embodiments of the present invention. The memory 205 may include, but is not limited to, the following types of devices: cache, ROM, PROM, EPROM, EEPROM, flash, SRAM, and DRAM.

As shown in FIG. 2, the memory 205 may contain up to seven or more categories of software and/or data: an operating system 215, a format conversion module 220, a data verification module 225, a tax preparation module 230, a payment options module 235, a refund options module 240, and a communication module 245. The operating system 215 generally controls the operation of the data processing system. In particular, the operating system 215 may manage the data processing system's software and/or hardware resources and may coordinate execution of programs by the processor 200.

The format conversion module 220 may be configured to convert tax information from various sources, both electronic and non-electronic, into a common electronic format for further processing. The data verification module 225 may be configured to check the tax data that is input and/or downloaded into the data processing system 105, for example, for accuracy and to verify that information with the taxpayer. The tax preparation module 230 may be configured to prepare a tax return based on tax data associated with a taxpayer. In accordance with various embodiments of the present invention, the tax preparation module 230 may be configured with the tax and accounting algorithms used to prepare a tax return and/or may communicate with tax preparation software provided by an external source. The payment options module 235 may be configured to present a taxpayer with various ways in which to pay a tax and to facilitate the payment of the tax in accordance with the taxpayer's preference. Similarly, the refund options module 240 may be configured to present a taxpayer with various ways in which the taxpayer may receive a refund and to facilitate the transfer of value in the form of cash or other asset, for example, to the taxpayer. The communication module 245 may be configured to facilitate communication with other data processing systems and/or devices over a communication medium, such as a wireless and/or wireline network.

Although FIG. 2 illustrates an exemplary software architecture that may be used in data processing systems, such as data processing system 105 of FIG. 1, for processing and/or filing a tax return in accordance with some embodiments of the present invention, it will be understood that the present invention is not limited to such a configuration but is intended to encompass any configuration capable of carrying out operations described herein.

Computer program code for carrying out operations of data processing systems discussed above with respect to FIG. 2 may be written in a high-level programming language, such as C or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described herein with reference to flowchart and/or block diagram illustrations of methods, systems, and computer program products in accordance with exemplary embodiments of the invention. These flowchart and/or block diagrams further illustrate exemplary operations for processing and/or filing a tax return, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 3:
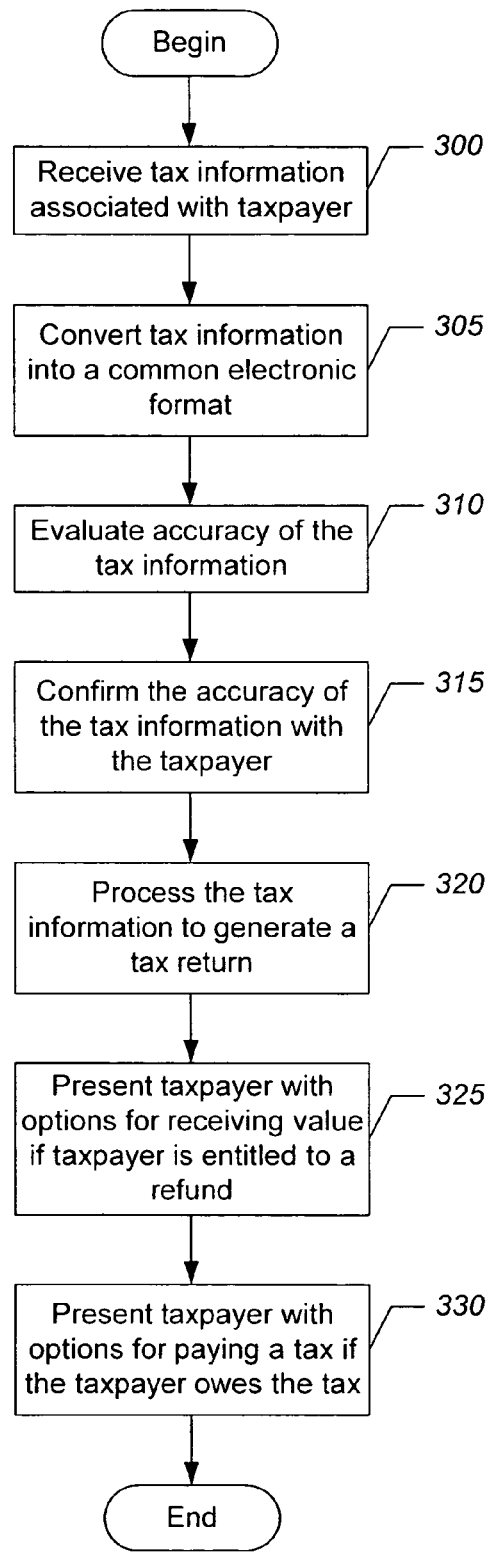
FIG. 3 is a flowchart that illustrates operations for processing and/or filing a tax return in accordance with some embodiments of the present invention.

Referring now to FIG. 3, exemplary operations for processing and/or filing a tax return, in accordance with some embodiments of the present invention, will now be described. Operations begin at block 300 where the data processing system 105 of FIG. 1, for example, receives tax information associated with a taxpayer. In accordance with various embodiments of the present invention, the tax information may be obtained/received from various sources. For example, the tax information may be obtained from paper-based source documents including, but not limited to, Form W-2, various types of Form 1099, canceled checks, bank statements, barcoded documents, and the like. In some embodiments, a taxpayer may complete a form with tax related information, which may then be scanned into the data processing system 105. A taxpayer may also input tax information to the data processing system 105 directly using, for example, a keyboard, mouse, electronic pen, and/or other peripheral device. The taxpayer may also be presented with a series of questions that the taxpayer may answer, for example, using touch-screen technology. The data processing system 105 may also use the communication module 245 of FIG. 2 to download tax information from one or more sources, e.g., revenue authorities 110 and/or 115 of FIG. 1, and/or to download tax information from a tax information repository; such as the repository 120 of FIG. 1.

At block 305, the format conversion module 220 of FIG. 2 may convert the received tax information into a common electronic format for further processing. For example, the information provided via paper-based documents may be scanned in or read by the format conversion module 220 so that all of the tax information is in an electronic format. The format conversion module 220 may then convert the electronic information into a common electronic format for further processing.

Operations continue at block 310 where the data verification module 225 processes the tax information to ensure that the tax information is accurate, consistent, and is not missing one or more pieces of data that are deemed to be essential. In addition, the data verification module 225 may also determine if any of the information provided is irrelevant and may notify the taxpayer that such information will be discarded or ignored. At block 315, the data verification module 225 may display the tax information to the user in an organized format to allow the taxpayer to confirm and/or correct the information that has been provided. The taxpayer may be presented with a choice of languages should the taxpayer be unable to read the information in a default language provided by the data processing system 105. In some embodiments, the taxpayer may be presented with one or more questions to close gaps in the tax data, resolve inconsistencies, and/or correct inaccuracies. To reduce the possibility for fraud, the data verification module 225 may use biometrics (e.g., fingerprint, iris-scan, retina-scan, and/or facial recognition) to identify the taxpayer.

Once the taxpayer has confirmed that the data is complete, accurate, and consistent, the tax preparation module 230 processes the tax information to generate a tax return at block 320. In other embodiments, the data processing system 105 may transmit the information obtained from the taxpayer to a live tax preparer using the communication module 245 where a tax return may be generated. As discussed above, the tax preparation module may be configured with tax algorithms to generate a tax return at the data processing system 105 and/or may communicate with tax preparation software located remote to the data processing system 105 to generate the tax return.

If the taxpayer is entitled to a refund, then the refund options module 240 presents the taxpayer with various options for receiving value at block 325. In accordance with various embodiments of the present invention, the refund options module 240 may present the taxpayer with the option of filing the tax return electronically and receiving the refund in cash, a spendable asset, and/or an instrument of value associated with a merchant, e.g., a gift card, refund debit/cash card. In this regard, if the taxpayer elects to receive a refund in cash, then the refund options module 240 may determine if the refund amount is below a predetermined threshold. If so, then the entire refund amount may be dispensed in cash; otherwise, the refund options module 240 may cause the data processing system 105 to dispense cash up to the threshold value and issue a check, money order, and/or some other spendable asset/instrument of value for the entire refund amount and/or the difference between the refund amount and the predetermined threshold. In accordance with various embodiments of the present invention, the threshold value may be any value up to the entire refund amount. Moreover, the threshold value may be an amount elected by the taxpayer.

In other embodiments, the tax return may be filed electronically and a refund anticipation financial instrument, such as a refund anticipation loan, refund anticipation cashier's check, and/or refund anticipation fund transfer, may be arranged for. The data processing system 105 may then dispense a spendable asset, such as cash, from the refund anticipation financial instrument. In still other embodiments, the tax return may be filed electronically and the refund may be sent to the taxpayer via U.S. mail.

The refund options module 240 may also present an option for an unbanked taxpayer to become banked. For example, if the taxpayer does not have a bank account, then the communication module 245 may be used to communicate with a financial institution to establish an account that may be used to deposit the taxpayer refund check. In accordance with various embodiments of the present invention, the account may be a conventional bank account, a transitory bank account that is to be used solely for holding a refund anticipation loan, or a bank account that comprises two categories: a savings purse and a spending purse. The taxpayer is required to visit a bank location to access funds in the savings purse; however, the spending purse may be accessed using a debit card, ATM card, credit card, or the like.

If the taxpayer is not entitled to a refund, then the payment options module 235 presents the taxpayer with various options for paying a tax at block 330. For example, the data processing system 105 may file the return electronically and allow the taxpayer to pay the tax via a credit or debit card. Alternatively, the return may be filed electronically and the data processing system 105 may accept cash from the taxpayer and/or arrange for an electronic transfer of funds to pay the tax that is owed. In still other embodiments, the data processing system 105 may print the return for the taxpayer at the time of preparation that the taxpayer may then subsequently file at a date of his/her choosing using a payment methodology of his/her choosing.

It will be understood that the data processing system 105 may be used to prepare and file tax returns for various revenue authorities including, but not limited to, the IRS (Federal Government), state revenue authorities, and/or local/municipal revenue authorities (e.g., payment of real estate and/or personal property taxes). Moreover, although the data processing system 105 may be embodied as a self-serve tax preparation and filing system without the need for interaction with a live, tax specialist, the data processing system 105 may also present the user with the ability of contacting a tax specialist in real time to obtain advice on their return. The data processing system 105 may also present the taxpayer with tax planning strategies that the taxpayer may wish to consider for his/her current and/or future returns. Once a tax return is filed, a taxpayer may use the data processing system 105 either directly or through a toll-free telephone number, for example, to check on the status of the return. The taxpayer may be charged a fee for use of the data processing system 105 and/or the tax preparation services may be offered to the taxpayers free of charge or at a reduced cost as a merchant may pay a fee for the privilege of locating the data processing system 105 at his/her place of business. Merchants may be highly motivated to locate the data processing system 105 embodied as a self-serve tax preparation kiosk in their place of business because those taxpayers who receive refunds may be provided with cash or other value cards associated with the merchant that may be spent immediately in the merchant's store.

While the data processing system 105 is busy processing tax information and/or preparing a return, advertisements may be displayed on the screen, which, in some embodiments, may be targeted to the taxpayer based on his/her tax or other information. The data processing system 105 may also provide the taxpayer with the ability to contact a sales person associated with the advertisement, request more information electronically on the subject of the advertisement, and/or print a coupon.

In addition to providing tax preparation and filing services, the data processing system 105 may also combine other features that may be of value to taxpayers. For example, the data processing system 105 may also provide ATM functionality, check cashing functionality, Internet access functionality, bookkeeping functionality (e.g., canceled checks may be scanned and then categorized for bookkeeping purposes), and/or information kiosk functionality.

Advantageously, embodiments of the present invention may allow taxpayers with little or no knowledge of tax law to prepare and/or file a tax return on a self-serve basis. Embodiments of the present invention may also be used to collect information through scanning, for example, process this information to organize the relevant portions and to discard the irrelevant portions, and forward this information to another entity for further processing. This may be particularly useful for low-income taxpayers who may not have the financial resources to engage a tax practitioner or obtain access to the Internet to file a tax return electronically. Thus, embodiments of the present invention may obviate the need for many taxpayers to engage paid tax preparers, may reduce the effort required by the user to prepare and file a tax return, may reduce the costs of preparing a tax return, may reduce the cost of tax preparation to the taxpayer, and/or may reduce the length of time that a taxpayer must wait to receive a tax refund. In addition, embodiments of the present invention may assist the U.S. Internal Revenue Service in meeting its mandated goal that 80% of all tax returns be filed electronically by the year 2007.

In addition, embodiments of the present invention may be used to process tax returns from previous years to determine if there are any errors contained therein. This may allow a taxpayer to file an amended return to obtain a refund or pay additional tax that is owed. For example, the data processing system 105 may be used to scan a taxpayer's prior year tax return as a source document for both personal and financial information. The data processing system 105 may evaluate the accuracy of the information and the calculations made thereon and may then notify the taxpayer if any errors or inconsistencies are discovered. The taxpayer may be asked to submit additional information, if necessary, to obtain correct the correct information. The taxpayer may then be presented with the option of having an amended tax return prepared, which may then be filed electronically as discussed above or a printed for filing separately by the taxpayer. Moreover, the taxpayer may be presented with various options for receiving a refund or paying a balance due as discussed in detail above.

Other embodiments of the present invention may be used to initiate a financial transaction. For example, the data processing system 105 may scan one or more financial documents. The information contained on these document(s) may then be converted into an electronic format. A determination may then be made whether the information is sufficient to initiate the financial transaction. The financial transaction may then be initiated if the information has been determined to be sufficient. Examples of financial transactions that may be initiated using the data processing system 105 include, but are not limited to, applying for a loan, establishing an account with a financial institution, and paying a personal and/or real property tax.

The flowchart of FIG. 3 illustrates the architecture, functionality, and operations of some embodiments of systems, methods, and computer program products for processing and/or filing a tax return in accordance with some embodiments of the present invention. In this regard, each block represents a module, segment, or portion of code, which comprises one or more executable instructions for implementing the specified logical function(s). It should also be noted that in other implementations, the function(s) noted in the blocks may occur out of the order noted in FIG. 3. For example, two blocks shown in succession may, in fact, be executed substantially concurrently or the blocks may sometimes be executed in the reverse order, depending on the functionality involved.

Many variations and modifications can be made to the preferred embodiments without substantially departing from the principles of the present invention. All such variations and modifications are intended to be included herein within the scope of the present invention, as set forth in the following claims.

That which is claimed:

1. A method of initiating a financial transaction, comprising:
    scanning at least one financial document;
    converting information on the at least one financial document into an electronic format;
    determining if the information is sufficient to initiate the financial transaction; and
    initiating the financial transaction if the information has been determined to be sufficient.

2. The method of claim 1, wherein the financial transaction is a loan.

3. The method of claim 2, wherein the loan is a tax refund anticipation loan.

4. The method of claim 1, wherein the financial transaction is the establishment of an account with a financial institution.

5. The method of claim 1, wherein the financial transaction is payment of a personal and/or real property tax.

6. A system for initiating a financial transaction, comprising:
    means for scanning at least one financial document;
    means for converting information on the at least one financial document into an electronic format;
    means for determining if the information is sufficient to initiate the financial transaction; and
    means for initiating the financial transaction if the information has been determined to be sufficient.

7. The system of claim 6, wherein the financial transaction is a loan.

8. The system of claim 7, wherein the loan is a tax refund anticipation loan.

9. The system of claim 6, wherein the financial transaction is the establishment of an account with a financial institution.

10. The system of claim 6, wherein the financial transaction is payment of a personal and/or real property tax.

11. A computer program product for initiating a financial transaction, comprising:
    a non-transitory computer-readable medium comprising computer readable program code, the computer readable program code comprising:
    computer readable program code for scanning at least one financial document;
    computer readable program code for converting information on the at least one financial document into an electronic format;
    computer readable program code for determining if the information is sufficient to initiate the financial transaction; and
    computer readable program code for initiating the financial transaction if the information has been determined to be sufficient.

12. The computer program product of claim 11, wherein the financial transaction is a loan.

13. The computer program product of claim 12, wherein the loan is a tax refund anticipation loan.

14. The computer program product of claim 11, wherein the financial transaction is the establishment of an account with a financial institution.

15. The computer program product of claim 11, wherein the financial transaction is payment of a personal and/or real property tax.

* * * * *